(12) United States Patent
Rivest et al.

(10) Patent No.: US 8,699,713 B1
(45) Date of Patent: Apr. 15, 2014

(54) KEY UPDATE WITH COMPROMISE DETECTION

(75) Inventors: Ronald L. Rivest, Arlington, MA (US); Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 32 days.

(21) Appl. No.: 13/250,225

(22) Filed: Sep. 30, 2011

(51) Int. Cl.
*H04L 9/00* (2006.01)
*H04L 29/06* (2006.01)
*H04L 9/08* (2006.01)

(52) U.S. Cl.
CPC ............... *H04L 63/068* (2013.01); *H04L 9/08* (2013.01); *H04L 9/0891* (2013.01)
USPC ........................................................ 380/277

(58) Field of Classification Search
CPC ........ H04L 63/068; H04L 9/08; H04L 9/0891
USPC ............................................................ 380/277
See application file for complete search history.

(56) References Cited

U.S. PATENT DOCUMENTS

| | | | |
|---|---|---|---|
| 4,720,860 A | 1/1988 | Weiss | |
| 5,168,520 A | 12/1992 | Weiss | |
| 5,361,062 A | 11/1994 | Weiss et al. | |
| 2005/0058139 A1* | 3/2005 | Monzawa et al. | 370/397 |
| 2005/0094814 A1* | 5/2005 | Aihara | 380/247 |
| 2007/0140480 A1* | 6/2007 | Yao | 380/30 |
| 2007/0201700 A1* | 8/2007 | Hacigumus | 380/277 |
| 2009/0240944 A1* | 9/2009 | Cho et al. | 713/175 |
| 2009/0323964 A1* | 12/2009 | Park et al. | 380/277 |
| 2009/0323969 A1* | 12/2009 | Nishi | 380/281 |
| 2010/0202618 A1* | 8/2010 | Yang et al. | 380/277 |
| 2010/0303231 A1* | 12/2010 | Gorissen et al. | 380/210 |

OTHER PUBLICATIONS

R. Anderson et al., "Key Infection: Smart Trust for Smart Dust," Proceedings of the 12th IEEE International Conference on Network Protocols (ICNP), Oct. 2004, pp. 206-215.
M. Bellare et al., "Key Insulation and Intrusion Resilience Over a Public Channel," Topics in Cryptology—CT-RSA in Lecture Notes in Computer Science (LNCS) 5473, Apr. 2009, pp. 84-99.
M. Bellare et al., "Forward-Security in Private-Key Cryptography," Topics in Cryptology—CT-RSA in Lecture Notes in Computer Science (LNCS) 2612, Feb. 2003, pp. 1-18.
Y. Dodis et al., "A Generic Construction for Intrusion-Resilient Public-Key Encryption," Topics in Cryptology—CT-RSA in Lecture Notes in Computer Science (LNCS) 2964, Feb. 2004, pp. 81-98.
G.T. Amariucai et al., "An Automatic, Time-Based, Secure Pairing Protocol for Passive RFID," RFIDSec, Jun. 2011, pp. 1-20.

(Continued)

*Primary Examiner* — Techane Gergiso
(74) *Attorney, Agent, or Firm* — Ryan, Mason & Lewis, LLP

(57) ABSTRACT

A key is updated in a first cryptographic device and an update message comprising information characterizing the updated key is sent from the first cryptographic device to a second cryptographic device. The update message as sent by the first cryptographic device is configured to permit the second cryptographic device to detect compromise of the updated key by determining if an inconsistency is present in the corresponding received update message based at least in part on that received update message and one or more previously-received update messages. In an illustrative embodiment, the first cryptographic device comprises an authentication token and the second cryptographic device comprises an authentication server.

20 Claims, 3 Drawing Sheets

(56) References Cited

OTHER PUBLICATIONS

EPCGlobal Inc., "EPC Radio-Frequency Identity Protocols, Class 1 Generation-2 UHF RFID Protocol for Communications at 860 MHz-960 MHz, Version 1.2.0," Specification for RFID Air Interface, http://www.gs1.org/gsmp/kc/epcglobal/uhfc1g2, Oct. 2008, pp. 1-108.

Gene Itkis, "Forward Security: Adaptive Cryptography: Time Evolution," Handbook of Information Security, 2006, pp. 1-27, vol. 3, No. 199.

G. Itkis et al., "SiBIR: Signer-Base Intrusion-Resilient Signatures," Advances in Cryptology—CRYPTO in Lecture Notes in Computer Science (LNCS) 2442, Aug. 2002, pp. 499-514.

A. Juels et al., "Unidirectional Key Distribution Across Time and Space with Applications to RFID Security," 17th USENIX Security Symposium, Jul.-Aug. 2008, pp. 75-90.

M. Lehtonen et al., "How to Detect Cloned Tags in a Reliable Way from Incomplete RFID Traces," IEEE International Conference on RFID, Apr. 2009, pp. 257-264.

S.M. More et al., "Sliding-Window Self-Healing Key Distribution," Proceedings of the ACM Workshop on Survivable and Self-Regenerative Systems (SSRS), Oct. 2003, pp. 82-90.

RSA, "Hardware Authenticators," The Security Division of EMC, http://www.rsa.com/node.aspx?id=1158, 2011, 2 pages.

J. Staddon et al., "Self-Healing Key Distribution with Revocation," IEEE Symposium on Security and Privacy, May 2002, pp. 241-257.

Gene Itkis, "Cryptographic Tamper Evidence," Proceedings of the 10th ACM Conference on Computer and Communications Security (CCS), Oct. 2003, pp. 355-364.

\* cited by examiner

KEY UPDATE WITH COMPROMISE DETECTION

FIELD OF THE INVENTION

The present invention relates generally to the field of cryptography, and more particularly to techniques for updating keys in a cryptographic device and communicating those updates to other cryptographic devices.

BACKGROUND OF THE INVENTION

Cryptographic devices include, by way of example, one-time passcode (OTP) devices such as hardware authentication tokens. Authentication tokens are typically implemented as small, hand-held devices that display a series of passcodes over time. A user equipped with such an authentication token reads the currently displayed passcode and enters it into a computer or other element of an authentication system as part of an authentication operation. This type of dynamic passcode arrangement offers a significant security improvement over authentication based on a static password.

Conventional authentication tokens include both time-synchronous and event-synchronous tokens.

In a typical time-synchronous token, the displayed passcodes are based on a secret value and the time of day. A verifier with access to the secret value and a time of day clock can verify that a given presented passcode is valid.

One particular example of a time-synchronous authentication token is the RSA SecurID® user authentication token, commercially available from RSA, The Security Division of EMC Corporation, of Bedford, Mass., U.S.A.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

Other known types of authentication tokens include hybrid time-synchronous and event-synchronous tokens.

Passcodes can be communicated directly from the authentication token to a computer or other element of an authentication system, instead of being displayed to the user. For example, a wired connection such as a universal serial bus (USB) interface may be used for this purpose. Wireless authentication tokens are also known. In such tokens, the passcodes are wirelessly communicated to a computer or other element of an authentication system. These wired or wireless arrangements, also referred to herein as connected tokens, save the user the trouble of reading the passcode from the display and manually entering it into the computer.

Additional details of exemplary conventional authentication tokens can be found in, for example, U.S. Pat. No. 4,720,860, entitled "Method and Apparatus for Positively Identifying an Individual," U.S. Pat. No. 5,168,520, entitled "Method and Apparatus for Personal Identification," and U.S. Pat. No. 5,361,062, entitled "Personal Security System," all of which are incorporated by reference herein.

Many authentication systems are configured to require that a user enter a personal identification number (PIN) or other static access code in addition to entering the passcode from the authentication token. This provides an additional security factor, based on something the user knows, thereby protecting against unauthorized use of an authentication token that is lost or stolen. Such an arrangement is generally referred to as two-factor authentication, in that authentication is based on something the user has (e.g., the authentication token) as well as something the user knows (e.g., the PIN).

Authentication tokens and other OTP devices are typically programmed with a random seed or other type of key that is also stored in a token record file. The record file is loaded into an authentication server, such that the server can create matching passcodes for the authentication token based on the key and the current time or current event count. When the user first activates the token, the server stores the user PIN in association with the key corresponding to that token.

An adversary possessing a stolen record file is able to generate correct passcodes for each token key stored in that file. In order to impersonate a particular user, the adversary would generally have to "phish" or otherwise obtain access to the details of at least one user login session such that it learns the user PIN as well as one passcode that can be matched to one of the token keys in the record file.

Security issues such as these can be addressed through the use of unidirectional or broadcast key updates. In this manner, the key associated with a particular authentication token is periodically refreshed or otherwise updated. However, conventional key update techniques are deficient in that the updates themselves can be compromised without the token user or the associated authentication server being aware of the compromise.

SUMMARY OF THE INVENTION

Illustrative embodiments of the present invention provide key update techniques in which multiple updates are directed from one cryptographic device to another cryptographic device in such a manner that the cryptographic device receiving updates purporting to be from the sending cryptographic device can determine whether or not the updates have been compromised by an adversary.

By way of example, in one of these embodiments, a sending cryptographic device sends a sequence of update messages to a receiving cryptographic device, which authenticates the received messages. There is concern that an adversary may have compromised the state of the sender or receiver in a manner that allows the adversary to insert messages into the stream that are accepted as authentic by the receiver. To enable detection of this type of compromise, the sender through the sequence of update messages will evolve its key state randomly, while transmitting enough information to the receiver to allow it to track these key updates. An adversary that compromises the sender or receiver state at a particular time, but does not have access to all of the updates since that time, risks being detected because later messages from the adversary will appear to the receiver to be inconsistently authenticated with respect to the updated key state possessed by the sender and receiver.

Accordingly, in one aspect of the invention, a key is updated in a first cryptographic device and an update message comprising information characterizing the updated key is sent from the first cryptographic device to a second cryptographic device. The update message as sent by the first cryptographic device is configured to permit the second cryptographic device to detect compromise of the updated key by determining if an inconsistency is present in the corresponding received update message based at least in part on that received update message and one or more previously-received update messages.

The information characterizing the updated key may comprise at least a portion of the updated key itself, or other information which may be used by the second cryptographic device in determining the updated key. For example, the update message may comprise a parity symbol of an error-correcting code, an updated key appended to at least one previous key, or an updated key embedded in a digital signature.

In one of the above-noted embodiments, the first cryptographic device comprises an authentication token and the second cryptographic device comprises an authentication server. In an arrangement of this type, the update message may be sent from the authentication token to the authentication server by embedding it in a passcode, digital signature or other cryptographic output of the authentication token. For example, the update message may be sent as one or more bits of the cryptographic output.

The illustrative embodiments advantageously overcome the drawbacks of conventional techniques, by providing key update techniques that allow an authentication server or other receiving party to determine if the updates have been compromised. Also, one or more of these embodiments allow key updates to be performed very efficiently, while maintaining a high level of security, particularly for devices such as authentication tokens or RFID tags that have limited cryptographic functionality.

These and other features and advantages of the present invention will become more readily apparent from the accompanying drawings and the following detailed description.

DETAILED DESCRIPTION

The present invention will be described herein with reference to exemplary cryptographic devices and associated authentication systems. It is to be appreciated, however, that the invention is not restricted to use with the particular illustrative device and system configurations shown.

The term "passcode" as used herein is intended to include authentication information such as OTPs, or more generally any other information that may be utilized for cryptographic authentication purposes. Although the illustrative embodiments will be described below primarily in the context of OTPs, it is to be appreciated that the invention is more broadly applicable to any other type of passcode.

The term "cryptographic device" as used herein is intended to be construed broadly, so as encompass not only authentication tokens but also other types of devices that can provide or process key updates in the manner disclosed herein. Similarly, the term "authentication server" should be understood to encompass any type of processing device or set of such devices that is operative to authenticate a passcode provided by an authentication token or other type of cryptographic device. It need not be a network-based server, and may be implemented as a portion of a device that performs other functions, as a combination of multiple servers or other devices, or in other forms.

As will be described, the present invention in one or more illustrative embodiments provides techniques for key update which permit a cryptographic device receiving updates purporting to be from a sending cryptographic device can determine whether or not the updates have been compromised by an adversary.

Figure 1:
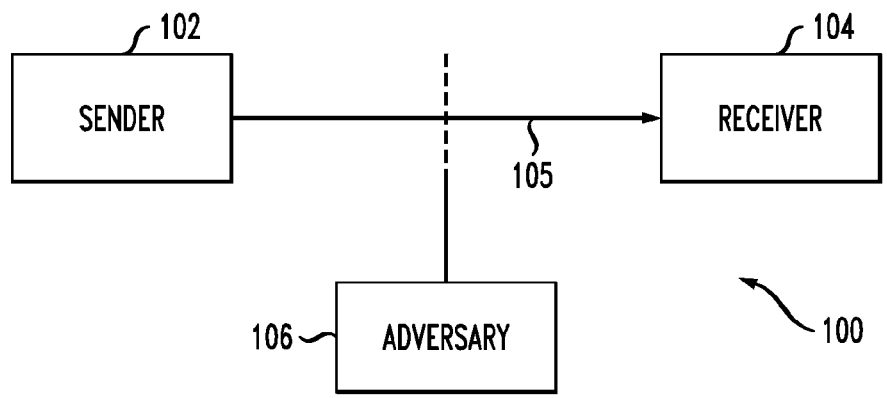
FIG. 1 is a simplified block diagram of an authentication system in an illustrative embodiment of the invention.

FIG. 1 shows a simplified view of an authentication system 100 in an illustrative embodiment of the invention. In the system 100, first and second cryptographic devices are respectively denoted as sender 102 and receiver 104. These devices communicate over a channel 105. An adversary 106 initiates security attacks in the system 100 at least in part by accessing channel 105.

In the system 100, a seed or other type of key in the first cryptographic device 102 may be updated periodically, for example. More generally, the key updates may be carried out in accordance with any pattern mutually understood by the sender and receiver, including non-periodic patterns. In conjunction with a given one of these updates, the first cryptographic device 102 sends an update message comprising information characterizing the updated key to the second cryptographic device 104.

As will be described in greater detail below, the update message as sent by the first cryptographic device 102 is configured to permit the second cryptographic device 104 to detect compromise of the updated key by determining if an inconsistency is present in the corresponding received update message based at least in part on that received update message and one or more previously-received update messages. The second cryptographic device 104 can therefore process multiple update messages purporting to be from the first cryptographic device 102 in order to detect compromise of the updated key.

A given one of the update messages may take on a variety of different forms, including, for example, a parity symbol of an error-correcting code, an updated key appended to at least one previous key, and an updated key embedded in a digital signature. Each of these examples may be viewed as a type of information characterizing the updated key, and is described in greater detail elsewhere herein. Thus, the phrase "information characterizing the updated key" as used herein may comprise at least a portion of the updated key itself, or other information which may be used by a receiver in determining the updated key.

In one or more of the illustrative embodiments, the sending cryptographic device 102 and the receiving cryptographic device 104 may comprise an authentication token and an authentication server, respectively. In an arrangement of this type, the update message may be sent to the authentication server embedded in a passcode or other cryptographic output of the authentication token. For example, the update message may comprise one or more bits of a passcode or other cryptographic output sent from the authentication token to the authentication server.

Figure 2:
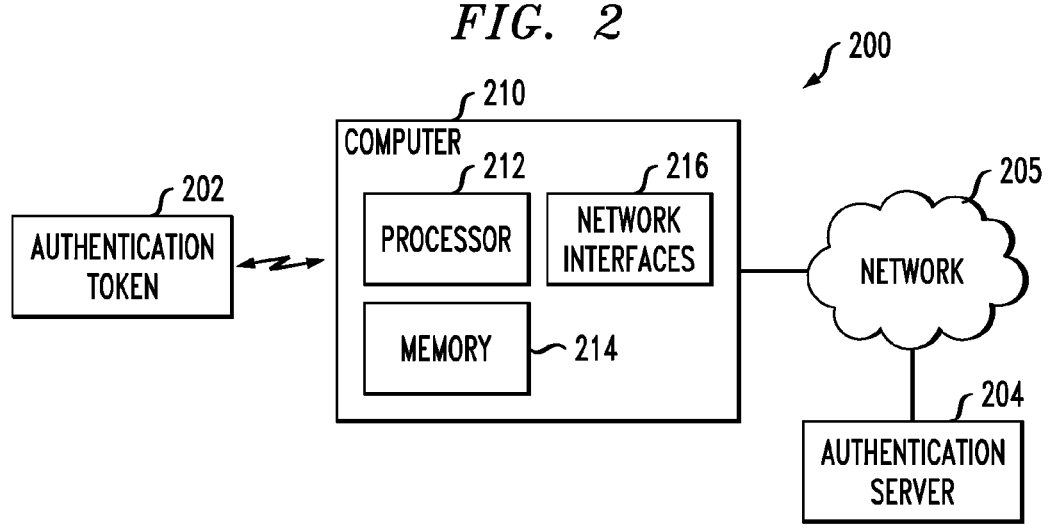
FIG. 2 is a more detailed block diagram of an authentication system comprising multiple cryptographic devices in an illustrative embodiment of the invention.

FIG. 2 shows an example of an authentication system 200 corresponding generally to an implementation of system 100 in which sender 102 comprises an authentication token 202 and receiver 104 comprises an authentication server 204. Information from the authentication token 202 is sent to the authentication server 204 via network 205 and a host device 210 that illustratively comprises a computer. As indicated previously, the term "cryptographic device" as used herein is intended to be broadly construed so as to encompass, for example, authentication token 202 alone or in combination with at least a portion of the computer 210. In other embodiments, such as those involving use of software tokens, the cryptographic device corresponding to sender 102 may comprise only computer 210, or another type of processing device, such as a mobile telephone.

The authentication token 202 is configured to generate OTPs or other passcodes in accordance with the techniques disclosed herein. Such passcodes may be presented to a user via a display of the token, such that the user can manually enter a given passcodes into a user interface of the host device 210. Alternatively, a given passcode may be communicated directly from the authentication token 202 via a wired or wireless connection between the token and the host device 210. By way of example, the authentication token may be configured to communicate with the host device 210 via a wired connection such as a USB interface, or via a wireless connection such as a Bluetooth or IEEE 802.11 connection.

The authentication token 202 may be, for example, a time-synchronous authentication token, an event-synchronous authentication token, a challenge-response token, a hash-chain token, or a hybrid token that incorporates multiple such capabilities, such as a hybrid time-synchronous and event-synchronous token. A given authentication token may be a connected token or a disconnected token, or one capable of operating in both connected and disconnected modes. The disclosed techniques can be adapted in a straightforward manner for use with other types of authentication devices, or more generally cryptographic devices.

Use of one or more of these alternative authentication tokens may require that the update message provide additional information indicating a current epoch, such as the current event counter in an event-synchronous authentication token.

The host device 210 may comprise a desktop or portable personal computer, mobile telephone, personal digital assistant (PDA), wireless email device, workstation, kiosk, television set-top box, game console, or any other information processing device that provides an interface between authentication token 202 and authentication server 204.

As shown in the figure, the host device 210 generally comprises a processor 212, a memory 214, and one or more network interfaces 216 which allow the device to communicate with the authentication server 204 over the network 205.

It should also be noted that a given authentication device need not take the form of a stand-alone hardware token. For example, such a device may be incorporated into another processing device, such as a computer, mobile telephone, etc. In one such implementation, the host device and the authentication token may be combined into a single processing device that communicates with the authentication server.

The network 205 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

In the system 200, the authentication server 204 is configured as a back-end authentication server, in that it communicates with host device 210 over a network, but other types of authentication servers may be used.

A wide variety of conventional authentication processes may be implemented using an authentication token 202 and authentication server 204 arranged as shown in FIG. 2. Examples of such processes are disclosed in A. J. Menezes et al., Handbook of Applied Cryptography, CRC Press, 1997, which is incorporated by reference herein.

Such processes, being well known to those skilled in the art, will not be described in further detail herein. The present invention does not require the use of any particular type of authentication process to authenticate the token 202 to the server 204.

It is to be appreciated that a given embodiment of the system 200 may include multiple instances of authentication token 202, authentication server 204 and host device 210, and possibly other system components, although only single instances of such components are shown in the simplified system diagram of FIG. 2 for clarity of illustration. Also, as indicated previously, other embodiments may combine certain system elements, such as the authentication token and the host device. It is also possible to eliminate, modify or replace other system elements. For example, authentication token 202 may communicate directly with authentication server 204, rather than via other elements such as host device 210 and network 205.

Figure 3:
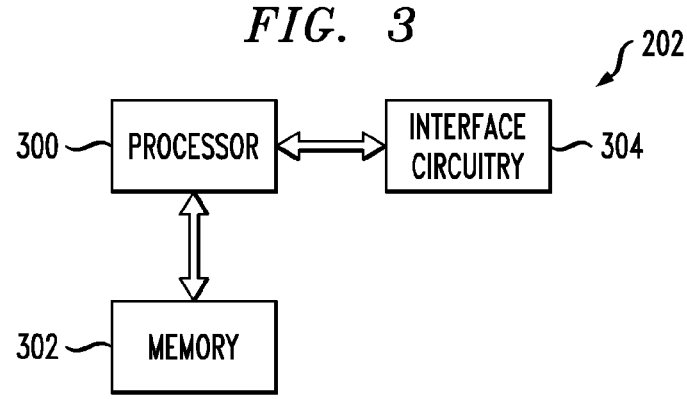
FIG. 3 illustrates portions of one of the cryptographic devices of the authentication system of FIG. 2.

Referring now to FIG. 3, portions of a given cryptographic device of the system 200 are shown. The cryptographic device is illustratively shown in FIG. 3 as representing authentication token 202, but similar elements may also be present in the authentication server 204. These devices may also include other types of elements commonly found in conventional implementations of such devices.

In this embodiment, the authentication token 202 comprises a processor 300 coupled to a memory 302. Accordingly, at least a portion of a key update process as disclosed herein may be implemented in the form of software that is executed on a cryptographic device comprising a processor coupled to a memory. Processor 300 is also coupled to interface circuitry 304. The interface circuitry 304 may comprise, for example, circuitry for interfacing the authentication token 202 to the host device 210 via a wired or wireless connection in the case of a connected token, or circuitry for generating a visual or audible presentation of a given generated password in the case of a disconnected token. Thus, the interface circuitry may include, for example, wired or wireless interface circuitry such as USB, Bluetooth or 802.11 circuitry, or one or more speakers, displays and associated drivers, in any combination.

The various elements 300, 302 and 304 of FIG. 3 may be implemented in whole or in part as a conventional microprocessor, microcontroller, digital signal processor, application-specific integrated circuit (ASIC) or other type of circuitry, as well as portions or combinations of such circuitry elements. As indicated previously, portions of a key update process in accordance with a given illustrative embodiment of the invention can be implemented at least in part in the form of one or more software programs that are stored at least in part in the memory 302 and executed by processor 300. Memory 302 may also be used for storing information used to perform passcode generation or other operations associated with authentication in the authentication system 200.

Techniques for key update with compromise detection in system 100 will now be described in greater detail, with reference to FIGS. 4 through 7.

In the embodiments to be described, the sending cryptographic device 102 updates one or more of its keys, and sends corresponding update messages to the receiving cryptographic device 104. The term "update" in this context is intended to be broadly construed, and may involve, for example, replacing a current value with a new value computed as a deterministic function of the current value and some fresh random input.

The keys in these embodiments may also be referred to as "drift keys" to reflect the fact that such keys evolve randomly over time in a manner unpredictable to an adversary. The drift keys are used by the sending party generally denoted as sender 102 in FIG. 1 to authenticate itself to the receiving party generally denoted as receiver 104 in FIG. 1. It is assumed without limitation that the adversary 106 can compromise either the sending party or the receiving party or both, and may also eavesdrop or block messages on the channel 105. However, it is further assumed that the state of the sender or receiver is unaffected, particularly with respect to information about the key.

As one example, assumed that sender 102 authenticates to receiver 104 on a daily basis. On day d, the sender uses key pair $\kappa_d=(a_d,b_d)$. At the beginning of every even-numbered day d, the sender replaces $a_{d-1}$ with a new, random value $a_d$, but leaves $b_{d-1}$ unchanged, i.e., lets $b_d=b_{d-1}$. When the sender communicates with the receiver, it uses $b_d$ to authenticate and encrypt its new key $a_d$. On odd-numbered days, the sender instead refreshes $b_{d-1}$. The receiver always knows at least one of the sender's keys, so the sender can successfully authenticate itself to the receiver.

Assume that the adversary 106 secretly steals the sender's key pair $\kappa_d=(a_d,b_d)$ on day d. Note that the adversary might steal the keys from the sender or from the receiver. After two days, the sender's key updates will render the adversary's stolen keys obsolete. Knowing neither component of $\kappa_{d+2}=(a_{d+2},b_{d+2})$, the adversary won't be able to impersonate the sender.

In the example above, the sender faithfully communicates every day with the receiver, ensuring that the receiver has fresh knowledge of the sender's current key $\kappa_d$. In practical settings, however, synchronization between the sender and the receiver may be sporadic. The term "synchronization" in this context is intended to be broadly construed, and may therefore encompass partial synchronization of sender and receiver, rather than complete synchronization of sender and receiver.

For instance, suppose that the sender logs into a server operated by the receiver using a time-synchronous authentication token (e.g., a SecurID® token) with daily key updates. If the sender doesn't log in on a given day and the receiver misses an update, the receiver's knowledge will become obsolete. For instance, if the receiver misses the sender's update to $a_d$ on day d, the receiver won't be able to decrypt the sender's update to $b_{d+1}$. At that point, the receiver will be left with an entirely obsolete key pair.

Exacerbating this problem is the fact that in the present embodiment it is assumed that the sender transmits but doesn't receive messages. So the sender doesn't know which of its key updates the receiver has received and therefore doesn't know for which of its keys, if any, the receiver's knowledge has become obsolete.

An important challenge, then, is to ensure that the sender's updates enable the receiver to remain at least loosely synchronized even when the receiver receives only a fraction of the updates. In one or more of the embodiments described below, we use erasure codes or other types of error-correcting codes for this purpose, effectively treating key updates that don't reach the receiver as erasures in the sender's ongoing transmissions to the receiver.

While we assume that the adversary's compromise of the sender is transient, we also consider the possibility that the adversary subsequently intercepts, i.e., sees and prevents the receiver from receiving, some number e of the sender's key updates to the receiver. For example, if the sender is using a hardware authentication token, the adversary might phish some of the sender's passcodes. This is, of course, a stronger attack than eavesdropping, and may serve to model the effect of eavesdropping by the adversary.

As noted above, the sending cryptographic device 102 may comprise authentication token 202. The SecurID® token, for example, displays a changing passcode, typically six digits, which the user types into a computer or other host device in order to authenticate a session to a server. The token does not accept input, and the passcodes are its only form of output. Consequently, in a drift key process of the type disclosed herein, these passcodes may be used as a channel through which key updates can be propagated. At the same time, embedding key updates in passcodes weakens the passcodes themselves, in that every bit of key update data means one less bit of passcode. It is important, therefore, that key updates in such embodiments be compact. Embodiments will be described in which the key updates consume no more than a few bits per passcode, and possibly just a single bit per passcode.

Additionally, passcodes only reach the server when a user authenticates. For tokens with passcodes updated at a rate of one per minute, then, very few of the passcodes reach the server. Put another way, the vast majority of update messages in such an embodiment may be considered lost.

We model an exemplary drifting-key update process DK in terms of a sender S that transmits to, but doesn't receive messages from a receiver R, where S and R correspond to sender 102 and receiver 104, respectively, in the authentication system 100 of FIG. 1. It will be further assumed that these sending and receiving parties are implemented as authentication token 202 and authentication server 204, respectively. We model time as discrete timesteps, e.g., minutes. The current timestep is denoted by t.

Variables include:

$\kappa_t$: The set of m keys of the sender S at time t. We let $\kappa_t[i]$ denote the $i^{th}$ such key, and K denote the space from which individual keys are drawn, i.e., $\kappa_t[i] \in K$. Note that keys may be short, and in some cases may even be single bits. For convenience, we refer to $\kappa_t$ itself as a key, even though it is a composite of multiple keys. The term "key" as used herein is therefore intended to be broadly construed, and may comprise, for example, at least a portion of a seed or other secret value, or sets of such secret values, suitable for use in implementing cryptographic authentication processes.

$\lambda_t$: The knowledge held by the receiver R of $\kappa_t$ at time t; we let $\lambda_t[i] \in L$ denote the $i^{th}$ component, where L is the key space for R. The receiver R might, for instance, set $\lambda_t[i]$ to its most recent knowledge of $\kappa_t[i]$, in which case L=K, i.e., the key space for the receiver is the same as the key space for the sender. We optionally let $\lambda'_t$ denote additional receiver state, e.g., information about the receiver's history of successfully received updates. We omit $\lambda'_t$ as appropriate for clarity.

$\mu_t$: The key-update message generated by the sender in the current timestep.

Functions applied by the token and server include:

keygen(l) $\xrightarrow{\$}$ $(\kappa_0, \lambda_0)$: A key generation function that yields an initial sender key and its counterpart for the receiver, where l is a security parameter;

evolve(t, $\kappa_{t-}$) $\to \kappa_t$: A randomized key-update function;

updategen(t, $\kappa_t$) $\to \mu_t$: A function that computes an update message;

synch(t, $\lambda_{t-1}$, [$\lambda'_{t-1}$], $\mu_t$) $\to \lambda_t$: A server-knowledge update function; when R receives no update (taking $\mu_t = \phi$), we define synch(t, $\lambda_{t-1}$, [$\lambda'_{t-1}$], $\phi$) $\to \lambda_{t-1}$;

keyver(t, $\kappa_t, \lambda_t$) $\to$ {accept, reject}: A key verification function; indicates whether the key $\kappa_t$ appears valid to R, i.e., is consistent with $\lambda_t$ in the view of R; in the case of attack, indicates whether $\kappa_t$ is sufficiently close to $\kappa_t$ to enable successful impersonation of S. We say that $\kappa_t$ is valid at time t if keyver($\kappa,\lambda_t$)→accept.

We further define:

R(t,$\kappa_t,\Delta$): The drift range of a key $\kappa_t$ over an interval of time. Given $\kappa_t$, R(t,$\kappa_t,\Delta$) is the set of possible values assumed by $\kappa_{t+\Delta}$, i.e., generated by $\Delta$ successive applications of evolve to $\kappa_t$.

In certain embodiments, keys are updated uniformly at random in K and independently of one another. We refer to such update processes herein as "simple." In a simple update process, $\log_{|K|}|R(t,\kappa_t,\Delta)|$ is equal to the number of distinct keys updated over the interval [t,t+$\Delta$]. We write $\overline{R}(t,\kappa_t,\Delta)=|\log_{|K|}R(t,\kappa_t,\Delta)|$.

We consider a passive adversary A, i.e., one that may learn but not modify state of sender S or receiver R. The adversary A corresponds to adversary 106 in FIG. 1 and may compromise either sender S or receiver R at any time u of its choice. That is, it may perform one or both of the following two attacks:

Sender compromise: A corrupts S, learning its internal state ($\kappa_t$).

Receiver compromise: A corrupts R, learning its internal state (i.e., $\lambda_t,[\lambda'_t]$).

It is assumed that A does not compromise the source of randomness used by S, that is, it does not make future updates by S predictable.

For simplicity, we assume that A chooses to compromise S. This is in general a stronger attack than compromising R, whose knowledge ($\lambda_t,\lambda'_t$) of $\kappa_t$ may not be perfectly fresh.

As an additional simplification here, we may assume that when S updates R, R learns S's state completely and exactly. In other words, we assume updategen(t,$\kappa_t$)=$\mu_t,\mu\kappa_t$, meaning that S transmits its entire current key $\kappa_t$.

Some time after the adversary A has compromised S at time u, S sends an update to R. We let v denote the time at which this update occurs. Later, at time w, A attempts to impersonate S. We model this impersonation as a forgery, in which A attempts to produce a key $\kappa'_w$ that is accepted by the receiver, i.e., such that $\kappa'_w \in R(v,\kappa_v,w-v)$.

Figure 4:
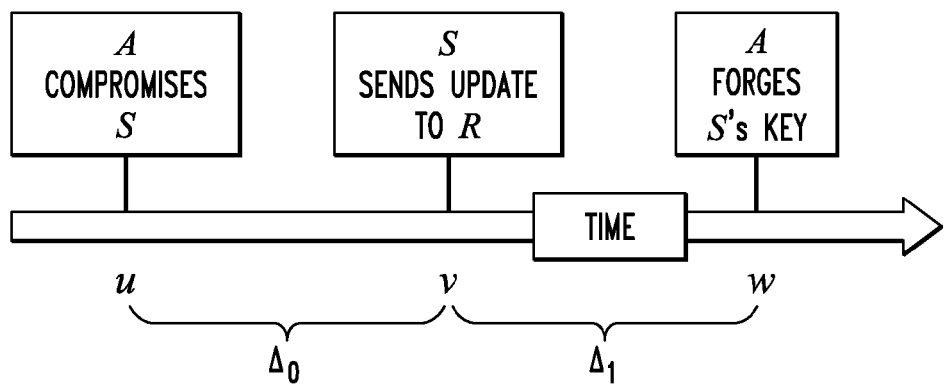
FIG. 4 illustrates an attack timeline in the authentication system of FIG. 1 or FIG. 2.

We define $\Delta_0$=v−u, that is, the time that elapses between compromise of S, and S's update to R. Similarly, we define $\Delta_1$=w−v, the time between S's update and the forgery attempt by A. We let $\Delta=\Delta_0+\Delta_1$=w−u. We use $\Delta_0$ informally to denote the time interval [u,v], $\Delta_1$ to denote [v,w] and $\Delta$ to denote [u,w]. We let $\Delta$ denote a set of pairs ($\Delta_0,\Delta_1$); thus $\Delta$ defines a constraint on the attack timeline of A. A timeline of this attack by the adversary A is shown in FIG. 4.

As described above, A is modeled as a strong adversary, one that can choose a time of compromise u, and set the keys ($\kappa_u,\lambda_u$) respectively of S and R. Additionally, A is stateful. Thus, when it forges $\kappa'_w$, it remembers ($\kappa_u,\lambda_u$).

In another possible adversarial model, A attempts to guess a correct key at time v, i.e., before R receives an update from S, and S sends an update. In this case, A's intrusion may still be detected after the fact.

Suppose that A successfully passes off an incorrect key, i.e., is accepted with $\kappa'_w \neq \kappa_t$, its intrusion will cause R to accept update its own key knowledge to $\kappa'_t$. Such synchronization with A creates a later opportunity to detect the intrusion: When S later sends an update $\kappa_{t+\Delta}$, R may reject it as inconsistent with $\kappa'_t$.

Such after-the-fact detection corresponds to a timeline in which the positions of w and v in FIG. 4 are reversed. In some drifting-key processes, e.g., one or more of the uniformly staggered update processes described below, the probability of detection of A's intrusion will be identical for the original and reversed timelines. To see this, we can think of A and S as entities in which is $\kappa_{t^*}$ evolves independently. Intrusion detection requires only that two evolving keys differ and that A and S therefore present inconsistent keys to R. The order of presentation doesn't matter.

We also consider a stronger A that may, after compromising S, intercept a total of e updates emitted by S. That is, at e distinct times t, it may perform the following update interception action: A learns $\mu_t$, but R doesn't. We assume here that A not only learns $\mu_t$, but prevents it from reaching R. Thus, A's attack is strictly stronger than eavesdropping. An interception of this kind might come about, for instance, as the result of a phishing attack against the passcode generated by an authentication token. The assumption that $\mu_t$ doesn't reach R also ensures that R receives no updates in the interval $\Delta_1$.

Security against this stronger adversary is possible, for example, when updates contain only partial information about S's key. It may be helpful to confine $\mu_t$ to a partial "view" of $\kappa_t$ not merely to protect against an intercepting adversary A. As we explain below, partial views are also a useful optimization for resource-constrained environments, as they result in shorter messages $\mu_t$.

Observe that security against a sender-compromising adversary is possible if evolve is randomized. If evolve is deterministic, then once A learns the sender's state, it can compute all future states.

An active adversary is one capable of arbitrary modification of the state of R and S. It can modify the keys and/or executable code of either party.

A limited form of active compromise, namely transient modification of keys $\kappa_t$ or $\lambda_t$, wouldn't benefit the adversary. By increasing $|\kappa_t-\lambda_t|$, i.e., weakening synchronization between sender and receiver, A increases the likelihood of an authentication failure by S, which may trigger an alarm in the authentication system indicative of a potential compromise. By decreasing $|\kappa_t-\lambda_t|$, i.e., tightening synchronization between the sender and receiver, A makes authentication failure on its own part more likely.

On the other hand, by modifying executables, A would gain an advantage. It might, for instance, modify the key-evolution function on S so that keys evolve pseudorandomly under a seed s known to A, and are thus trackable by A. Intrusion detection for a general adversary of this type is generally not possible, as A can perfectly simulate S.

In some scenarios, it may be hard for A to achieve persistent, active compromise in any case. The executable code of standalone hardware token, for instance, may reside in read-only memory. Similarly, if R is an authentication server, good security practices would prompt periodic refresh and measurement (e.g., via a hardware root of trust) of R's software stack, and thus the detection and removal of malware.

Exemplary key update processes with full key transmission will initially be described. Intuitively, a drifting-key process is secure when R achieves more precise knowledge of $\kappa_w$ than A. To capture the notion of knowledge formally, consider a fixed triple (u,v,w). Define $D_R=|R(v,\kappa_v,\Delta_0)|$ as the number of possible values of $\kappa_w$ given R's knowledge of $\kappa_v$; $D_R$ is the set of keys that R accepts as valid. Define $D_A=|R(u,\kappa_u,\Delta_0+\Delta_1)|$ as the set of possible, valid keys in the view of A, given its knowledge of $\kappa_u$.

The objective of A is to guess a key in the space $D_R$. As the set of possible valid keys given A's knowledge is $D_A$, then the probability that A guesses correctly is at most $D_R/D_A$. This assumes that keys in $D_A$ are equiprobable.

Figure 5:
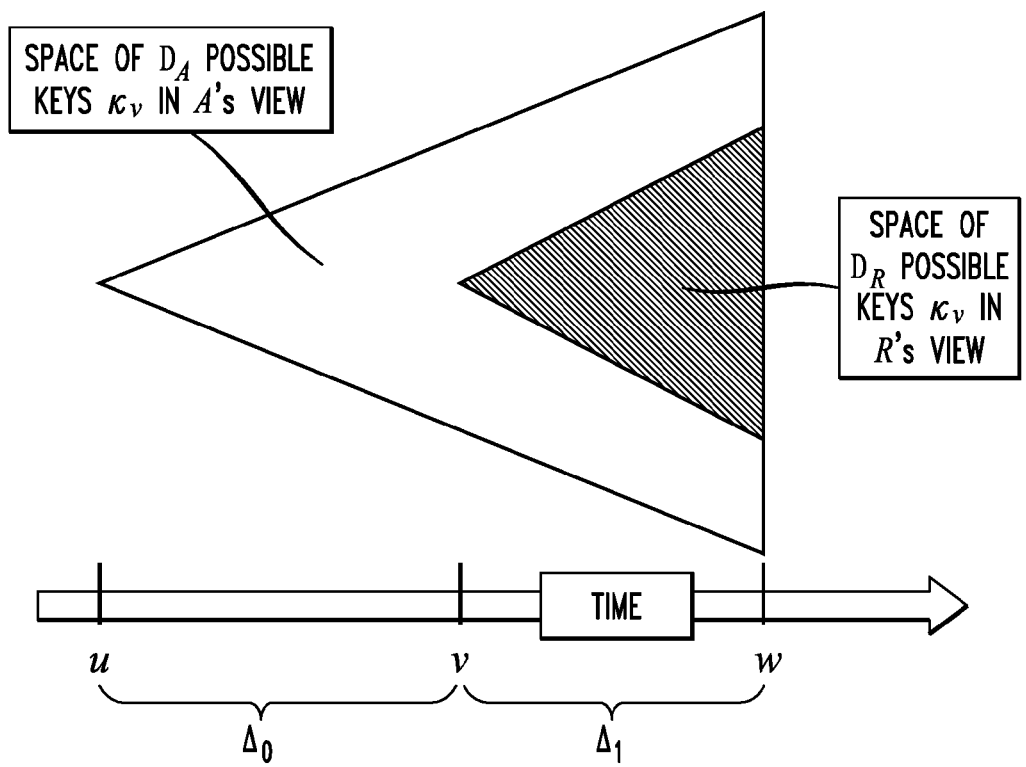
FIG. 5 shows security aspects of an illustrative embodiment of the invention.

The key space $D_A$ grows over the interval $\Delta_0+\Delta_1$, while $D_R$ grows over the shorter interval $\Delta_1$. A drifting-key process achieves strong security when $D_A$ grows substantially larger than $D_R$. This security aspect of one or more embodiments of the present invention is illustrated in FIG. 5.

For the special case of simple processes, we introduce the notion of a safe key $\kappa[i]$. A key may be viewed as "safe" if it drifts advantageously in a designated security experiment: In particular, R knows $\kappa_w[i]$, but A doesn't.

Figure 6:
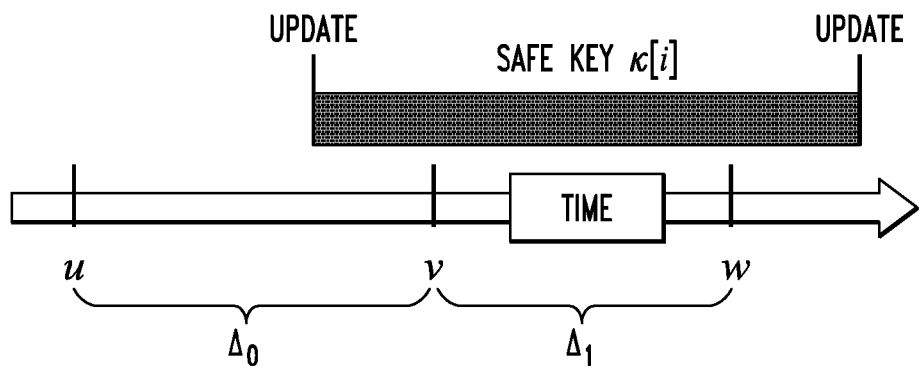
FIG. 6 shows a timeline defining a safe key in an illustrative embodiment of the invention.

More specifically, a key $\kappa[i]$ may be considered safe if it is updated during the interval $\Delta_0$, so that the adversary doesn't know its value at w, but remains unchanged during the interval $\Delta_1$, so that R knows its value at w. The timeline corresponding to a safe key is depicted in FIG. 6.

In a simple process, security depends on the number of safe keys induced by the triple (u,v,w). The more safe keys there are, the more precise R's knowledge of $\kappa_t$ with respect to A's. Indeed, given k safe keys for a triple (u,v,w), it can be shown that $D_R/D_A = |K|^{-k}$.

In one embodiment, we employ periodic updates. S's key K, is refreshed by means of periodic randomizations of each its keys at different times.

Associated with each component i is a pair of positive integers $(p_i,d_i)$, respectively denoting the period and phase of updates to $\kappa_t[i]$. Updates in this embodiment proceed according to the following rule: Update key $\kappa_t[i]$, i.e., set $\kappa_t[i] \xleftarrow{R} K$, at time t if $t \equiv d_i \pmod{p_i}$, where the notation $x \xleftarrow{R} K$ denotes assigning to x an element selected at random from K. Otherwise, $\kappa_t[i] \leftarrow \kappa_{t-1}[i]$, i.e., the key remains unchanged.

This general framework offers considerable flexibility, as there are no a priori constraints on the periods $p_i$ or the phases $d_i$. In the case of authentication token design, for instance, considerations such as the frequency of login by ordinary users, etc., can play a role in the selection of the periods and phases.

A natural strategy of periodic updates is one in which a set of m keys have the same period p, but distinct phases that are multiples of d, for some d|p. Thus m=p/d. We refer to this as a uniformly staggered process US with period p and phase shift d. Its use is illustrated by the following example.

A hardware authentication token contains a drifting key $\kappa_t$ consisting of seven one-bit keys, each updated on a different day of the week. It maintains this key in addition to its primary key for generating passcodes. The first bit is randomized every Sunday, the second every Monday, and so forth. That is, it employs US with p=7 and d=1, where timesteps are days. Thus m=p/d=7, $\kappa_t = \{\kappa_t[1], \ldots, \kappa_t[7]\}$, K=\{0,1\}, and key $\kappa[i]$ has $(p_i,d_i)=(7,i)$ for $1 \le i \le 7$.

When computing a passcode, the token combines its primary key with a representation of $\kappa_t$, providing protection against compromise of its primary key. As will be described below, other approaches may be used to combine the two keys.

For a US process with period p and phase shift d, it can be shown that for any timeline with $\Delta_0 \ge zd$ and $\Delta_1 \le p-zd$, there are at least z safe keys.

Also, if we define $\alpha, \beta, z$ such that $0 < \beta < \alpha$ and $z > 1$, and let $\Delta = \{(\Delta_0,\Delta_1) | z \le \Delta_1 \le z(1+\beta) \text{ and } \Delta_0 > \alpha\Delta_1\}$, it can be shown that a US process with period $p=z(1+\alpha)$, $d=z(\alpha-\beta)$, and thus $m=(1+\alpha)/(\alpha-\beta)$ keys is safe for $\Delta$.

Additional techniques for achieving security in a similar context are disclosed in G. Itkis, "Cryptographic Tamper Evidence," Proc. CCS '03, pp. 355-364, October 2003, and G. Itkis and L. Reyzin, "SiBIR: Signer-Base Intrusion-Resilient Signatures," Advances in Cryptology—CRYPTO 2002, Lecture Notes in Computer Science, pp. 101-116, 2002, which are incorporated by reference herein.

In a US process of the type disclosed herein, the drift range of $\kappa$ covers the full key space after p=md timesteps. (i.e., $R(t,\kappa,md)=K^m$.) It can be shown that US is in fact optimal for a broad class of timelines in which $\Delta$=md.

To see this, first define $\Delta_{m,d} = \{\Delta = \{(\Delta_0,\Delta_1)=(s,md-s)\}_{s \in S}\}_s \subseteq [0,md]$. Observe that the class $\Delta_{m,d}$ includes, for instance, the set $\Delta$ of all timelines in which $\Delta$=md. It can then be shown that given key space $K^m$, US with period p=md phase shift d is optimal for any $\Delta \in \Delta_{m,d}$. That is, for any l, $\max_A \text{Succ}_{DK,A}^{basic}(l)[\Delta]$ is minimized by DK=US.

We now consider constructions with partial key transmission. These generally include processes in which $\mu_t$ contains partial information about $\kappa_t$. We refer to $\mu_t$ as a view of $\kappa_t$. Adopting this design variant brings at least two benefits. First, it is possible to create a process resistant to an A that intercepts/eavesdrops on updates $\mu_t$ during the interval $\Delta_1$. Second, $\mu_t$ can be compact, i.e., we can achieve $|\mu_t| << |\kappa_t|$, which is a benefit in resource-constrained settings.

One possible approach to partial key transmission is for S to send keys directly. For instance, it might set $\mu_t$ to a randomly selected key $\kappa_t[i]$, $i \xleftarrow{R} [1,m]$. This approach helps achieve the two objectives above, but other embodiments can provide better results.

For example, $\mu_t$ can instead be computed as a function over multiple keys. This approach yields at least two improvements. First, R can learn information about $\kappa_t$ from partial updates with better communication efficiency, i.e., from fewer updates than via random keys; R thereby detects divergence in keys and thus intrusions more quickly. Second, R can achieve a security advantage over A when it has fresher knowledge of $\kappa_t$. Intuitively, we can "encrypt" updates under keys for which R already has a fresh view.

We more particularly can compute $\mu_t$ as the parity symbol of a non-systematic linear erasure code computed over $\kappa_t$. Conceptually, then, we treat $\kappa_t$ as a message to be transmitted over a lossy channel. When an update doesn't reach R, it constitutes a lost symbol. A parity symbol in this embodiment is computed as the dot product $< \kappa_t[1], \ldots, \kappa_t[m] > \cdot \vec{v}_t$, where $\vec{v}_t \in K^m$, although other types of error-correcting codes can be used in other embodiments.

As a simple example, if the symbols/keys of $\kappa_t$ are bits, a one-bit update value $\mu_t$ might be computed as the exclusive-or (XOR) of a pseudorandom subset determined by t, i.e., $\vec{v}_t \in \{0,1\}^m$.

The goal of R is not explicitly to reconstruct any key $\kappa_t$, but to detect inconsistencies in parity symbols. However, reconstruction of keys is a convenient approach to detecting inconsistencies.

While it isn't necessary that R reconstruct $\kappa_t$ explicitly, it may be advantageous in forensic analysis for R to be able to determine the time of intrusion, i.e., time at which $\kappa_t$ has been compromised.

We will now describe periodic update processes with partial views. Since updated keys in such processes are generated independently at random, it's convenient to think of them as new keys appended to $\kappa$. With this perspective, $\kappa$ is initialized as an m-symbol message, but grows over time. For example, in a US process with phase shift d, a new key is appended to $\kappa$ every d timesteps. At time t, then $\kappa$ is a message of length $m_t = m + \lfloor t/d \rfloor$. Let $\gamma(t)$ denote the number of updates/parity symbols received by R at time t. For simplicity, we'll label updates and parity vectors here iteratively. Thus R has collected a vector of parity symbols $\vec{\mu}_{\gamma(t)} = \{\mu_1, \mu_2, \ldots, \mu_{\gamma(t)}\}$ at time t. $\mu_t$ is computed as $\kappa_t \cdot \vec{v}_t$. R signals an intrusion when it detects an inconsistency among the parity symbols in $\vec{\mu}_{\gamma(t)}$.

We thus treat $\kappa_t$ as an $m_t$-symbol message and the codeword $\vec{\mu}_{\gamma(t)}$ of $\gamma(t)$ parity symbols. These parity symbols are computed by a linear erasure code defined by the generator matrix $$G_t = \begin{pmatrix} \vec{v}_1 \\ \vec{v}_2 \\ \ldots \\ \vec{v}_{\gamma(t)} \end{pmatrix}.$$

One possible way to detect inconsistencies in $\vec{\mu}_{\gamma(t)}$ is to check for inconsistencies in $\vec{\mu}_{\gamma(t)}$ at every timestep t. For example, one could compute the parity-check matrix $H_t$ corresponding to $G_t$ and check that $H_t \vec{\mu}_{\gamma(t)} = 0$.

A more efficient approach is one in which the parity vectors $\vec{v}_i$ are uniformly random, with the constraint that $\vec{v}_i[m]=1$, i.e., the most recently updated key bit is always included in the parity check.

When the server receives an update, it performs Gaussian elimination to solve for the most recently updated key bit, if possible, or to check for consistency if the update gives an equation that is linearly dependent on the previous equations.

Note that by constraining the parity vectors to have a 1 in the last position, we ensure that the first update in any given key period is linearly independent of all previous equations the server has received.

Suppose keys are updated weekly and the parity vector changes every minute. For simplicity, we assume for now that the server gets completely synchronized with the initial key, and afterwards the user logs in at least once per week. This means at the end of each week the server completely knows that week's key.

The adversary's probability of logging in successfully may be analyzed as follows. Suppose the adversary's break-in and eavesdropping all occur before week i, and the adversary attempts to log in during week i. Then inconsistency will be detected with probability ½, because the adversary effectively needs to guess the most recent bit in order to guess the update bit. Specifically, if the user has already logged in during week i, then the adversary has probability ½ of succeeding (and never being caught), and if the user has not yet logged in during week i, then the adversary's login will succeed with probability 1, but when the user logs in later during week i, inconsistency will be detected with probability ½.

If the adversary forges during the same week as the break-in, it will always succeed.

Suppose the adversary breaks in during week i, then does some eavesdropping of updates, including at least one update during week i+d, and attempts to log in during week i+d. If it can find a vector that is linearly dependent on what it knows (and can attack precisely at the corresponding minute), then the adversary can login with success probability 1. If the adversary cannot attack at a time when the vector is linearly dependent on what it knows, then it will succeed with probability ½. If the adversary has obtained k linearly independent equations from the eavesdropping, then it effectively has k+(m−d) linearly independent equations in the m current key bits. Then the probability that another vector of random binary coefficients (ending with a 1) will give an equation that is linearly dependent on the ones known to the adversary is: $2^{(k+m-d-1)}/2^{(m-1)} = 2^k/2^d$. So, if the eavesdropping rate is high and/or the adversary has precise control over the minute when it attacks, the adversary will be able to succeed in logging in without inconsistency ever being detected.

It should be noted that if $\vec{v}$ is computed as a function of t alone, then A can select a time w that biases $\mu_w$ in its favor. For example, if $\vec{v} \in \{0,1\}^m$, and A doesn't know $\kappa[i]$ at a given time, it can choose a time w such that $\vec{v}_w[i]=0$. The value $\kappa[i]$ in this case will not form part of the computation of $\mu_w$. One approach to addressing this issue is to make $\vec{v}_t$ depend on $\kappa_t$.

In other embodiments, computationally secure processes may be used. One or more of the previously-described embodiments provide information-theoretic security. That is, they assume no computational bounds on A. Variants are possible, however, in which updates are constructed as ciphertexts using keys of $\kappa_t$ for encryption. R's imperfect view of $\kappa_t$ remains in this approach, as above, a challenge. Such variants may be based on an encryption process that functions even when R knows only a fraction of the encryption key, where that fraction is unknown to S.

Applications of the techniques disclosed herein include, for example, hardware and software authentication tokens, wireless sensors, device pairing arrangements, and RFID tags. The corresponding devices in these and other applications may be viewed as examples of "cryptographic devices" as that term is broadly used herein. Thus, a wireless sensor or RFID tag with cryptographic capability may be considered a type of cryptographic device that can participate in a key update process of the type described herein.

With regard to device pairing, key update processes as disclosed herein can support device pairing according to a policy in which a target device grants access rights only to other devices in communication with it over an extended period of time.

An example of a known pairing protocol that may be adapted to incorporate a key update process as disclosed herein is described in G. T. Amariucai et al., "An Automatic, Time-Based, Secure Pairing Protocol for Passive RFID," RFIDSec, 2011, which is incorporated by reference herein. This known pairing protocol is referred to as an "adopted pet" or AP protocol. It should be appreciated that the AP protocol is just one example of a known pairing protocol that may be adapted to incorporate one or more aspects of the present invention. Techniques disclosed herein may also be applied to other known pairing protocols.

In an AP protocol, a device such as an RFID tag, gradually leaks a secret key $\kappa$. A reader in proximity to the tag for an extended period of time can learn $\kappa$. However, one that receives tag outputs over only limited-duration intervals of time cannot learn $\kappa$. Thus, for instance, a tag in a user's home might pair with a reader there overnight, while a maliciously operated reader in a commuter bus wouldn't have time enough to harvest $\kappa$ from the tag.

As proposed, the AP protocol leaks $\kappa$ through a key stream generated by a cryptographically weak pseudorandom number generator (PRNG), such as a linear-feedback shift register (LFSR), seeded by $\kappa$. By harvesting enough contiguous key stream data, a reader can break the PRNG and recover $\kappa$.

Drifting keys as disclosed herein offer a more flexible, general, and secure approach to AP protocol design. Very simply, the "adopted" device can emit views of its drift state $\kappa$. Continuous harvesting of these views permits recovery of a current state $\kappa_t$, which can serve as a key for access to the adopted device. This key may be used for temporary privileges or to obtain a long-term credential.

One advantage to this approach is that it may be calibrated to achieve any of a range of policies. For instance, if a large number of views are emitted per key update, then the receiving device need not listen continuously over a given interval of time, only intensively. Having differing periods among keys is another policy lever: If some keys have long periods (or are static), then learning a current key $\kappa_t$ initially requires more intensive communication than maintaining knowledge of $\kappa_t$. Another advantage to key disclosure via views is the fact that bounds on the rate of disclosure are information theoretic. They don't require assumptions about the security of an underlying cryptographic primitive.

With regard to RFID tags, the cheapest type of RFID tag, and the one becoming most prevalent, is a barcode-type Electronic Product Code (EPC) tag. Such tags have read/write interfaces and PIN protection for sensitive operations such as tag disablement and sensitive data access. But they include no explicit features for tag authentication beyond a weak, easily spoofable read-only tag ID.

In many RFID system architectures, e.g., EPC Information Services (EPCIS), readers transmit data about the tags they scan (at least sporadically) to a centralized service. Researchers have proposed counterfeit detection techniques that exploit this global system view by detecting anomalous events, e.g., appearances in quick succession of a given tag ID in disparate locations in a supply chain.

Drifting keys as disclosed herein provide an improved approach to the detection of counterfeit tags in such environments.

As passive devices with fixed functionality, tags can't update keys themselves. Instead, in embodiments of the invention, readers perform updates to create drifting keys in tags. Within a tag is stored a drifting key $\kappa_{t^-}$ and the last time of update $t^-$. When a reader scans a tag, it applies the function evolve as many times as required, if any, to bring the tag up to the current timestep t. It transmits the resulting key $\kappa_t$ to the centralized service. Thus the tag/reader combination plays the role of S, while the centralized service acts as R. In an embodiment such as this, the RFID tag and its reader may be collectively viewed as a "cryptographic device" as that term is used herein.

The cloning of a tag is a type of intrusion: Its ID is instantiated in a clone device. Drifting keys can render this event detectable by the centralized service.

Of course, a malicious reader can update a tag with an invalid key, generating a false appearance of intrusion. But the presence of a malicious reader in the system is itself an intrusion whose detection is valuable. Alternatively, a reader can fail to update a tag's keys, a denial of service simply equivalent to the tag not being read.

Figure 7:
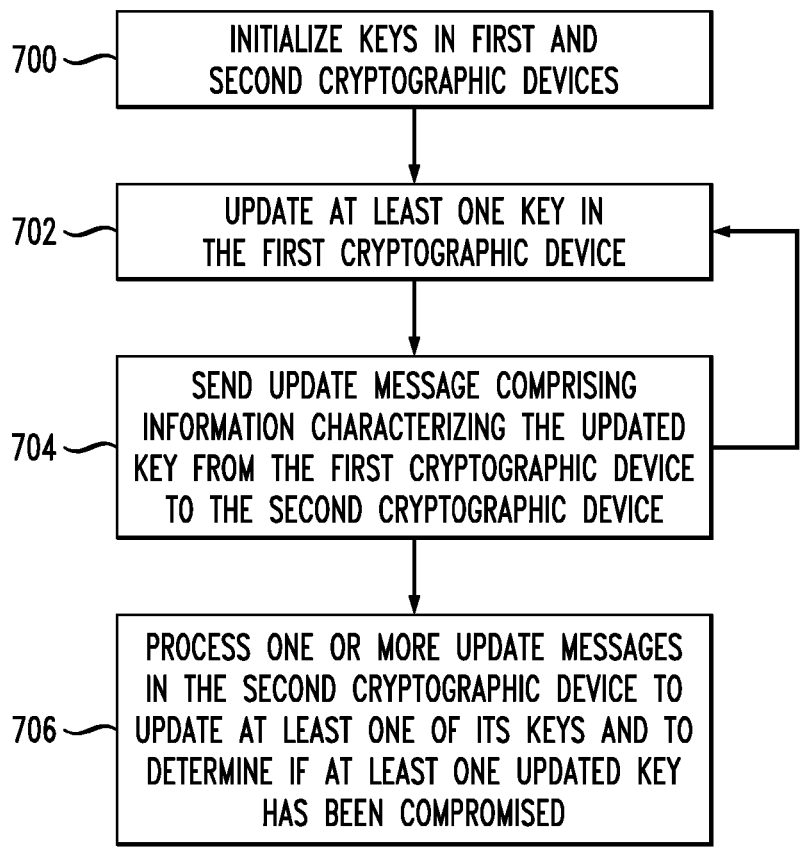
FIG. 7 is a flow diagram of a key update process with compromise detection as implemented in the authentication system of FIG. 1 or FIG. 2.

FIG. 7 shows one example of a key update process which implements drifting keys in an illustrative embodiment of the invention. This process is implemented by first and second cryptographic devices corresponding to the respective sender 102 and receiver 104 in the authentication system of FIG. 1. As noted previously, these first and second cryptographic devices may comprise a respective authentication token 202 and authentication server 204, or a pair of devices undertaking a device pairing protocol, or a respective RFID tag/reader combination and associated centralized service, or any other pair of cryptographic devices that implements a key update process to provide drifting key functionality which allows detection of key compromise.

The key update process as shown in FIG. 7 includes steps 700 through 706 as shown, which may be implemented at least in part utilizing cryptographic device processor and memory elements of the type previously described.

In step 700, one or more keys are initialized in each of the first and second cryptographic devices.

In step 702, at least one key is updated in the first cryptographic device.

In step 704, an update message is sent from the first cryptographic device to the second cryptographic device. The update message comprises information characterizing the updated key.

In step 706, the second cryptographic device processes one or more update messages to update at least one of its keys. As part of this processing, the second cryptographic device is able to determine if at least one updated key has been compromised, as described in greater detail above.

At least portions of the process as shown in FIG. 7 may be repeated periodically in order to provide multiple updates and associated compromise detection opportunities over time.

Other embodiments may use alternative process flows. For example, process steps indicated as being performed serially in FIG. 7 may be performed at least in part in parallel with one another.

In one possible implementation of the FIG. 7 update process, the first cryptographic device 102 sends a sequence of update messages to the second cryptographic device 104, which authenticates the received messages. The adversary may have compromised the state of the sender or receiver in a manner that allows the adversary to insert messages into the stream that are accepted as authentic by the receiver. The sender through the sequence of update messages will evolve its key state randomly, while transmitting enough information to the receiver to allow it to track the corresponding key updates. If the adversary compromises the sender or receiver state at a particular time, but does not have access to all of the updates provided by the sender since that time, the adversary risks being detected. This is because later messages from the adversary will appear to the receiver to be inconsistently authenticated with respect to the updated key state possessed by the sender and receiver.

Numerous alternative implementations of the FIG. 7 update process may be used in other embodiments.

It is to be appreciated that the term "inconsistency" as used herein in the context of a cryptographic device detecting compromise of an update is intended to be broadly construed so as to encompass update-related observations that are unlikely or otherwise improbable. For example, in an embodiment in which the next key to be updated is selected at random, and the keys are decimal digits, the cryptographic device receiving the updates may make the following observations at times T1, T2 and T3:

T1: 2 5 9 1 2 4 1 9 2
T2: 2 7 9 3 3 8 1 9 2
T3: 2 5 9 1 2 4 1 9 2

In this example, the drift key changes significantly between T1 and T2. Then between times T2 and T3, all changes are reversed. If T1, T2 and T3 define long enough intervals of time, then such a sequence is possible, but it is unlikely. It is instead more likely that an adversary has intercepted and replayed T1. Accordingly, an improbable event, possibly combined with other, external indicators, may be used to detect compromise of an updated key based on a sequence of update-related observations associated with received update messages in embodiments of the present invention.

One or more of the illustrative embodiments provide key update techniques that advantageously allow an authentication server or other receiving party to determine if key updates have been compromised by an adversary under certain conditions. Also, these embodiments allow key updates to be performed very efficiently, while maintaining a high level of security, particularly for devices such as authentication tokens or RFID tags that have limited cryptographic functionality.

It should again be emphasized that the above-described embodiments of the invention are presented for purposes of illustration only. Many variations and other alternative embodiments may be used. For example, although described primarily in the context of authentication tokens, the techniques are applicable to a wide variety of other types of cryptographic devices that can benefit from key update with compromise detection. Also, the particular configuration of system and device elements shown in FIGS. 1-3, and the key update processes and associated update message formats, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
updating at least one key in a first cryptographic device; and
sending an update message comprising information characterizing the updated key from the first cryptographic device to a second cryptographic device;
wherein said update message as sent by the first cryptographic device is configured to permit the second cryptographic device to detect compromise of the updated key by determining if an inconsistency is present in the corresponding received update message based at least in part on that received update message and one or more previously-received update messages;
wherein the updating step comprises generating an updated set of keys by applying a key update function to a previous set of keys, the key update function updating at least one key selected from the previous set of keys; and
wherein said update message sent in the sending step comprises at least one of: a parity symbol of an error-correcting code; an updated key appended to at least one previous key; and an updated key embedded in a digital signature.

2. The method of claim 1 wherein the first cryptographic device comprises an authentication token and the second cryptographic device comprises an authentication server.

3. The method of claim 2 wherein the step of sending an update message comprises sending said update message to the authentication server embedded in a cryptographic output of the authentication token.

4. The method of claim 3 wherein said update message sent in the sending step comprises one or more bits of the cryptographic output.

5. The method of claim 1 wherein the updating step comprises generating an updated set of keys $\kappa_t$ for time t by applying a randomized key update function to a previous set of keys $\kappa_{t-1}$ for time t-1.

6. The method of claim 5 wherein the sending step comprises sending an update message which is generated by applying an update message function to at least a portion of the updated set of keys $\kappa_t$ for time t.

7. The method of claim 6 wherein said update message sent in the sending step comprises the updated set of keys $\kappa_t$ for time t.

8. The method of claim 6 wherein said update message sent in the sending step comprises only partial information on the updated set of keys $\kappa_t$ for time t.

9. The method of claim 8 wherein the set of keys $\kappa_t$ for time t comprises m keys, i=1, 2, . . . m, and wherein said update message sent in the sending step comprises a particular selected key $\kappa_t[i]$, $i \leftarrow [1,m]$.

10. The method of claim 1 further comprising the step of processing said update message sent in the sending step and the one or more previous update messages in the second cryptographic device in order to detect compromise of the updated key.

11. The method of claim 1 wherein the first cryptographic device stores the updated key and a time at which the key was updated.

12. A method comprising the steps of:
updating at least one key in a first cryptographic device; and
sending an update message comprising information characterizing the updated key from the first cryptographic device to a second cryptographic device;
wherein said update message as sent by the first cryptographic device is configured to permit the second cryptographic device to detect compromise of the updated key by determining if an inconsistency is present in the corresponding received update message based at least in part on that received update message and one or more previously-received update messages;
wherein the updating step comprises generating an updated set of keys $\kappa_t$ for time t by applying a randomized key update function to a previous set of keys $\kappa_{t-1}$ for time t-1; and
wherein the randomized key update function updates individual keys $\kappa_t[i]$ in the set of keys $\kappa_t$ uniformly at random in a key space K and independently of one another, where the individual keys are selected from the key space K such that $\kappa_t[i] \in K$.

13. The method of claim 12 wherein associated with each key index component is a pair of positive integers $(p_i, d_i)$, respectively denoting period and phase of updates to the corresponding key $\kappa_t[i]$, and wherein key $\kappa_t[i]$ is updated by setting $\kappa_t[i] \xleftarrow{R} K$ at time t if $t = d_i \pmod{p_i}$ and otherwise key $\kappa_t[i]$ remains unchanged.

14. The method of claim 13 wherein the set of keys $\kappa_t$ for time t comprises m keys, i=1, 2, . . . m, and the m keys have the same period p, but different phases that are multiples of a phase shift d such that m=p/d.

15. A method comprising the steps of:
updating at least one key in a first cryptographic device; and
sending an update message comprising information characterizing the updated key from the first cryptographic device to a second cryptographic device;
wherein said update message as sent by the first cryptographic device is configured to permit the second cryptographic device to detect compromise of the updated key by determining if an inconsistency is present in the corresponding received update message based at least in part on that received update message and one or more previously-received update messages;
wherein the updating step comprises generating an updated set of keys $\kappa_t$ for time t by applying a randomized key update function to a previous set of keys $\kappa_{t-1}$ for time t-1;
wherein the sending step comprises sending an update message which is generated by applying an update message function to at least a portion of the updated set of keys $\kappa_t$ for time t;
wherein said update message sent in the sending step comprises only partial information on the updated set of keys $\kappa_t$ for time t; and wherein the set of keys $\kappa_t$ for time t comprises m keys, i=1, 2, ... m, and wherein said update message sent in the sending step comprises a parity symbol of a non-systematic linear erasure code computed over $\kappa_t$, with said parity symbol being computed as a dot product $\langle\kappa_t[1], \ldots, \kappa_t[m]\rangle \cdot \vec{v}_t$, where $\vec{v}_t \in K^m$ denotes a parity vector.

16. The method of claim 15 wherein the parity vectors $\vec{v}_i$ are uniformly random, with the constraint that $\vec{v}_i[m]=1$.

17. The method of claim 15 wherein the individual keys of $\kappa_t$ comprise respective bits, and a given one-bit update value is computed as an exclusive-or of a pseudorandom subset of the parity vectors $\vec{v}_t \in \{0,1\}^m$.

18. A method comprising the steps of:
updating at least one key in a first cryptographic device; and
sending an update message comprising information characterizing the updated key from the first cryptographic device to a second cryptographic device;
wherein said update message as sent by the first cryptographic device is configured to permit the second cryptographic device to detect compromise of the updated key by determining if an inconsistency is present in the corresponding received update message based at least in part on that received update message and one or more previously-received update messages;
wherein the updating step comprises generating an updated set of keys by applying a key update function to a previous set of keys, the key update function updating at least one key selected from the previous set of keys; and
wherein the updating and sending steps are repeated over multiple iterations, and receipt of a designated minimum number of the resulting update messages by the second cryptographic device allows the second cryptographic device to be cryptographically paired with the first cryptographic device.

19. A computer program product comprising a non-transitory processor-readable storage medium having embodied therein one or more software programs, wherein the one or more software programs when executed by a processor cause the steps of the method of claim 1 to be performed.

20. An apparatus comprising:
a first cryptographic device comprising a processor coupled to a memory;
the first cryptographic device being configured to update at least one key and to send an update message comprising information characterizing the updated key to a second cryptographic device;
wherein said update message as sent by the first cryptographic device is configured to permit the second cryptographic device to detect compromise of the updated key by determining if an inconsistency is present in the corresponding received update message based at least in part on that received update message and one or more previously-received update message;
wherein updating the at least one key comprises generating an updated set of keys by applying a key update function to a previous set of keys, the key update function updating at least one key selected from the previous set of keys; and
wherein said update message comprises at least one of: a parity symbol of an error-correcting code; an updated key appended to at least one previous key; and an updated key embedded in a digital signature.

* * * * *